United States Patent
Norman et al.

(10) Patent No.: US 8,837,095 B2
(45) Date of Patent: Sep. 16, 2014

(54) DC ELECTRICAL POWER SYSTEM

(75) Inventors: Patrick J. Norman, East Kilbride (GB); Stuart J. Galloway, Edinburgh (GB); Graeme M. Burt, Johnstone (GB)

(73) Assignee: Rolls-Royce PLC, London (GB)

( * ) Notice: Subject to any disclaimer, the term of this patent is extended or adjusted under 35 U.S.C. 154(b) by 291 days.

(21) Appl. No.: 13/370,954

(22) Filed: Feb. 10, 2012

(65) Prior Publication Data

US 2012/0228949 A1   Sep. 13, 2012

(30) Foreign Application Priority Data

Mar. 7, 2011   (GB) .................................. 1103798.3

(51) Int. Cl.
  *H02H 7/00* (2006.01)
  *H02H 3/16* (2006.01)
  *H02H 3/087* (2006.01)
  *H02H 7/26* (2006.01)

(52) U.S. Cl.
  CPC ................. *H02H 3/16* (2013.01); *H02H 3/087* (2013.01); *H02H 7/268* (2013.01)
  USPC .......................................................... 361/18

(58) Field of Classification Search
  USPC .......................................................... 361/18
  See application file for complete search history.

(56) References Cited

U.S. PATENT DOCUMENTS 5,751,524 A * 5/1998 Swindler .......................... 361/42
8,467,160 B2 * 6/2013 West ............................... 361/42

OTHER PUBLICATIONS

Xu et al., "Study on Bipole Protection of ± 800KV UHVDC System," 2010 International Conference on Electrical and Control Engineering, Jun. 25, 2010, pp. 4279-4282.
Chrysanthou et al., "Analysis of Coordination Between Primary and Secondary Protectors," *IEEE Transactions on Power Delivery*, Oct. 1997, pp. 1501-1507, vol. 12, No. 4.
European Search Report issued in European Application No. 12 15 4844 dated Jul. 23, 2012.

* cited by examiner

*Primary Examiner* — Stephen W Jackson
(74) *Attorney, Agent, or Firm* — Oliff PLC

(57) ABSTRACT

A DC electrical power system has a power generator converter system, a positive supply rail extending from the converter system, a negative supply rail extending from the converter system, and a midpoint earthing arrangement operatively connecting to the supply rails. The earthing arrangement is connected to earth by a solid earth connection. The network further has a first protective device on one of the supply rails which in case of a fault is operable to interrupt current flowing on that rail, and a second protective device on the earthing arrangement which in case of a fault is operable to interrupt current flowing to earth through the solid earth connection.

9 Claims, 2 Drawing Sheets

DC ELECTRICAL POWER SYSTEM

The present invention relates to a DC electrical power system having protective devices for fault protection.

In DC electrical networks, e.g. for use in aircraft systems, it is known to earth the network at the midpoint of a DC power supply. This reduces the insulation voltage levels in order to avoid corona and partial discharge and also helps to minimise the possibility of insulation failure over the lifetime of the equipment. A midpoint earthing arrangement can be created by using two equally rated capacitors connected in series. For example, FIG. 1 shows such an earthing arrangement for positive and negative supply rails 1 extending from the converter interface 2 of a power generator 3. The earthing arrangement comprises a line extending between the supply rails, with two equally rated capacitors C connected in series on the line, and the earth connection located between the capacitors. In a DC system, the earth arrangement may typically comprise one solid earth connection in conjunction with multiple high-impedance earth connections. This provides multiple earth points whilst preventing circulating earth currents (which can result from the effects of converter switching).

As shown in FIG. 2, conventional protection practice for DC systems of this type is to place protective devices 4 on each of the supply rails 5, in this way protecting against both rail-to-rail and rail-to-earth faults within the protected zone. The approach provides the following protective functionality:

- The fault current contribution to any network fault (both rail to earth and rail to rail) from both the generator (e.g. through a power electronic converter) and capacitive discharge (caused by a collapse/dip in network voltage resulting from the occurrence of the fault) can be limited.
- If current limiting technologies are employed, the protective devices can prevent significant decreases in voltage at the converter terminals, preventing increased current output from the converter in addition to preventing capacitive discharge.
- If a fault occurs between the converter and the protective devices, the operation of the protective devices can isolate the rest of the network from the fault.
- If the protection around the network is properly graded, only an earth fault between the converter and the protective devices can cause the loss of the solid earth connection from the network.

Particularly for mobile applications or where a battery system is used, DC systems offer advantages over AC systems, but their adoption may be restricted due to the size and weight burden of the required protection devices.

More particularly, both fuses and circuit breakers can interrupt either alternating current (AC) or direct current (DC), but a DC circuit breaker must usually be considerably larger than an AC breaker for a given interrupting current rating. This is because DC fault currents do not have a natural current zero to aid the extinction of the fault current. An AC breaker can make use of the two current reversals per electrical cycle (i.e. a reversal every 10 ms on a 50 Hz system), the fault arc between the switch contacts effectively extinguishing as the contacts are drawn apart and the current passes through zero. DC currents do not have such reversals to aid current interruption, and this results in DC circuit breakers being larger and heavier than equivalent AC equipment.

Accordingly, given the potentially significant weight and size penalties of DC fault interruption technologies, it is desirable to reduce the number of protection devices employed on a DC electrical network.

Accordingly, in a first aspect, the present invention provides a DC electrical power system having:
- a power generator converter system,
- a positive supply rail extending from the converter system,
- a negative supply rail extending from the converter system, and
- a midpoint earthing arrangement operatively connecting to the supply rails, the earthing arrangement being connected to earth by a solid earth connection;
- wherein the network further has:
- a first protective device on one of the supply rails which in case of a fault is operable to interrupt current flowing on that rail, and
- a second protective device on the earthing arrangement which in case of a fault is operable to interrupt current flowing to earth through the solid earth connection.

Advantageously, by locating the second protective device on the earthing arrangement it is possible to share the second protective device with other DC electrical power systems which are networked with the first power system. This allows an overall reduction in the number of protective devices, which provides corresponding weight and space savings.

The power system may have any one or, to the extent that they are compatible, any combination of the following optional features.

Typically, the power system has only the one protective device on the supply rails. In this way, lower losses can be obtained, allowing the power system to operate at a higher efficiency.

The power generator converter system may comprise a power generator and a converter interface for the power generator, the supply rails extending from the converter interface.

Alternatively, the power generator converter system may comprise two or more power generators and respective converter interfaces for the power generators, the converter interfaces being connected in series, the positive supply rail extending from an end one of the converter interfaces, and the negative supply rail extending from the other end one of the converter interfaces.

The earthing arrangement may include a pair of equally rated capacitances connected in series on a line extending between the supply rails, the solid earth connection being connected to the line between the capacitances.

Alternatively, when the power generator converter system comprises two or more power generators and respective converter interfaces, the earthing arrangement can connect the solid earth connection to a mid-position between the converter interfaces.

In a second aspect, the present invention provides a DC electrical power network having the DC electrical power system according to first aspect and further having one or more further DC electrical power systems, each further DC electrical power system having:
- a respective further power generator converter system,
- a positive supply rail extending from each further converter system, and
- a negative supply rail extending from each further converter system;
- wherein:
- the midpoint earthing arrangement operatively connects to the supply rails of each further converter system, and
- a further protective device is located on only one of the supply rails of each further converter system, which further protective device in case of a fault is operable to interrupt current flowing on that rail.

The earthing arrangement may include one or more high-impedance earth connections.

The DC electrical power system of the first aspect or the DC electrical power network of the second aspect may be for non-land-based use, e.g. for use in an off-shore facility or aerospace vehicle, such locations typically being more sensitive to size and weight burdens.

Indeed a third aspect, the present invention provides the use in an off-shore facility or aerospace vehicle of the DC electrical power network of the first aspect or of the DC electrical power network of the second aspect.

Embodiments of the invention will now be described by way of example with reference to the accompanying drawings in which.

Figure 3:
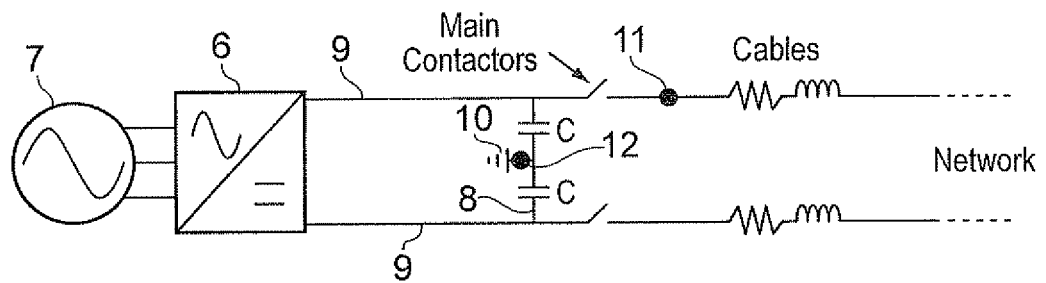
FIG. 3 shows a DC electrical power system having a protection arrangement according to a first embodiment of the present invention.

FIG. 3 shows a DC electrical power system having a protection arrangement according to a first embodiment of the present invention. The power system has a power generator converter system in which a converter interface 6 (e.g. a power electronic converter) converts AC power from an AC generator 7 into DC power. Positive and negative supply rails 6 extend from the converter interface to join the power system to an electrical network, which can include other power systems and loads.

The power system has a midpoint earthing arrangement in which a line 8 extends between the supply rails 9, equally rated capacitors C being connected in series on the line. A solid earth connection 10 is connected to the line between the capacitors.

The protection arrangement for the power system comprises a first protective device 11, such as a circuit breaker, which is located on one of the supply rails 9. The protection arrangement also comprises a second protective device 12 which is located at the solid earth connection. When the first protective device is operated, current flow along the respective supply line is interrupted. Likewise, when the second protective TO device is operated, current flow to earth through the solid earth connection is interrupted.

Figure 1:
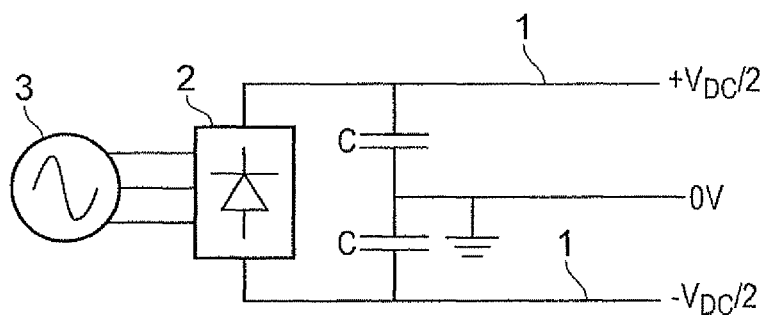
FIG. 1 shows an earthing arrangement for a DC electrical power system.
Figure 2:
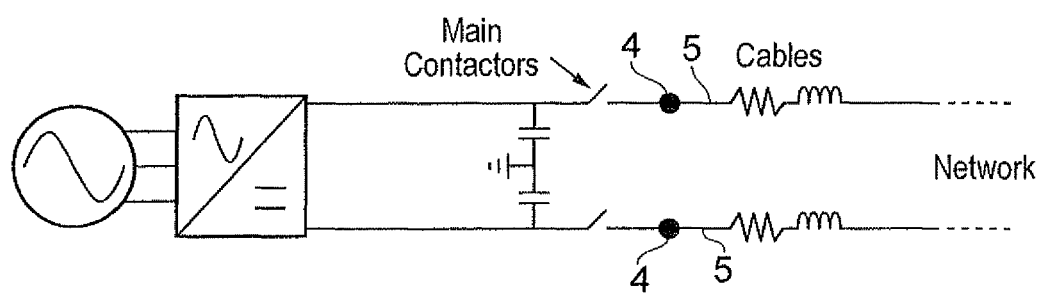
FIG. 2 shows a DC electrical power system having a conventional protection arrangement.

The arrangement of the protective devices shown in FIG. 3 provides the same protection functionality as the conventional arrangement of the protective devices shown in FIG. 2. The supply rail mounted device 11 protects against rail to rail faults and the earth connection mounted device 12 protects against rail to earth faults. For other systems within the network which have either a high impedance earth connection or no earth connection, only one protective device is hence needed, reducing the total number of devices employed. In particular, even for systems without a dedicated earth connection, the potential to suffer a rail to earth fault still exists (for example due to a breakdown in component insulation). Under such a circumstance, the solid earth connection 10 (even if not at the faulted system) provides a return path for the fault current. Hence the second protective device 12 can isolate an earth fault anywhere on the network.

More particularly, the arrangement provides the following protective functionality:

The fault current contribution to any network fault (both rail to earth and rail to rail) from both the generator 7 (through the converter interface 6) and capacitive discharge (caused by a collapse/dip in network voltage resulting from the occurrence of the fault) is limited.

If current limiting technologies are employed, the protective devices 11, 12 can prevent any significant decrease in voltage at the converter terminals, preventing increased current output from the converter in addition to preventing capacitive discharge.

While the converter system will not be completely isolated from the rest of the network if a fault occurs between the converter and the protective devices, only one supply rail 6 is left intact, making the flow of any current to the faulted system unlikely.

Any earth fault within the network will cause the earth mounted protective device 12 to operate, providing a limited ride-through capability for the network.

Advantageously, while providing adequate protection to the network, the arrangement requires fewer protective devices than the conventional approach. Therefore, even if the protective devices 11, 12 are required to be of a higher rating (because, being fewer, they are required to dissipate more energy), valuable savings in system weight and size can be obtained. More specifically, for a network have N power systems, 2N protective devices would be required (one on each rail) with the conventional approach, but only (N+1) protective devices are required utilising the approach of the present invention. Additionally, by having fewer protective devices in the main current paths of each system, lower operating losses can be obtained, providing a higher network efficiency. In the context of an aerospace vehicle application, this can lead to reduced fuel consumption, increased vehicle range and/or reduced emissions for a given mission profile.

In the event of an earth fault, the low impedance solid-earthed connection 10 is lost. However, other high impendence earth connections can still remain intact (and there will generally be a slow shift in potential at these locations). This is in contrast to the conventional approach where the location of the fault will determine whether the solid earth connection is lost or not.

Figure 4:
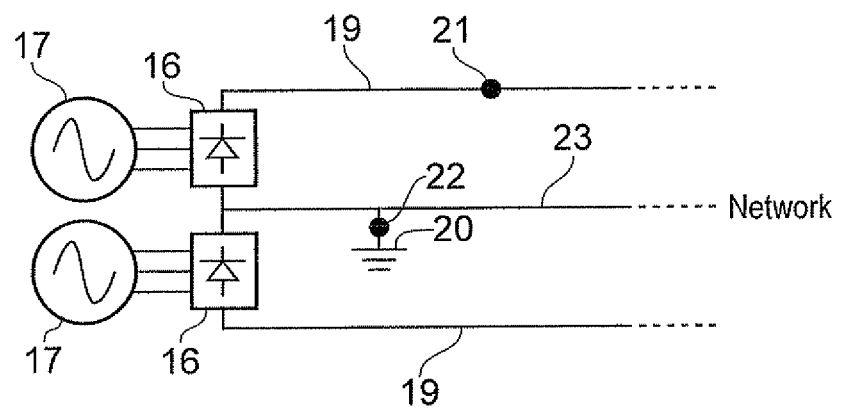
FIG. 4 shows a DC electrical power system having a protection arrangement according to a second embodiment of the present invention.

The arrangement of the protective devices shown in FIG. 3 can be employed in other situations where a midpoint earthing arrangement is used. For example, FIG. 4 shows a DC electrical power system having a protection arrangement according to a second embodiment of the present invention. The power system has a power generator converter system in which two converter interfaces 16 convert AC power from respective AC generators 17 into DC power. The converter interfaces are connected in series, one of the positive and negative supply rails 19 extends from one of the converter interfaces and the other of the positive and negative supply rails 19 extends from the other of the converter interfaces to join the power system to an electrical network. In other such power systems more converter interfaces can be connected in series, with the supply rails respectively extending from the end interfaces.

Midpoint earthing is then obtained by connecting the solid earth connection 20 to an earth rail 23 which extends from a point between the two interfaces 16. A first protective device 21 is located on one of the supply rails 19, and a second protective device 22 is located at the solid earth connection.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A DC electrical power system, comprising:
   a power generator converter system;
   a positive supply rail extending from the converter system;
   a negative supply rail extending from the converter system;
   a midpoint earthing arrangement operatively connected to the positive supply rail and the negative supply rail, the earthing arrangement being connected to earth by a solid earth connection;
   a first protective device on one of the positive supply rail and the negative supply rail, the first protective device being configured to, in case of a fault, interrupt current flowing on the one rail, and
   a second protective device on the earthing arrangement, the second protective device being configured to, in case of a fault, interrupt current flowing to earth through the solid earth connection.

2. A DC electrical power system according to claim 1 wherein the power generator converter system comprises a power generator and a converter interface for the power generator, the positive supply rail and the negative supply rail extending from the converter interface.

3. A DC electrical power system according to claim 1 wherein the power generator converter system comprises two or more power generators and respective converter interfaces for the power generators, the converter interfaces being connected in series, the positive supply rail extending from a first end of the converter interfaces, and the negative supply rail extending from a second end of another one of the converter interfaces.

4. A DC electrical power system according to claim 1, wherein the earthing arrangement includes a pair of equally rated capacitances connected in series on a line extending between the positive supply rail and the negative supply rail, the solid earth connection being connected to the line between the pair of capacitances.

5. A DC electrical power system according to claim 3, wherein the earthing arrangement connects the solid earth connection to a mid-position between the converter interfaces.

6. A DC electrical power network comprising the DC electrical power system according to claim 1 and further comprising one or more further DC electrical power systems, each further DC electrical power system having:
   a respective further power generator converter system,
   a positive supply rail extending from each further converter system, and
   a negative supply rail extending from each further converter system;
   wherein:
   the midpoint earthing arrangement operatively connects to the positive supply rail and the negative supply rail of each further converter system, and
   a further protective device is located on only one of the positive supply rail and the negative supply rail of each further converter system, the further protective device being configured to, in case of a fault, interrupt current flowing on the one rail.

7. A DC electrical power network according to claim 6, wherein the earthing arrangement further includes one or more high-impedance earth connections.

8. A DC electrical power system according to claim 1, configured for use in an off-shore facility or aerospace vehicle.

9. An off-shore facility or aerospace vehicle including the DC electrical power system according to claim 1.

* * * * *